April 23, 1957 F. A. CABELL 2,789,447
AUTOMATIC HYDRAULIC DIFFERENTIAL CONTROL MECHANISM
Filed April 26, 1955 4 Sheets-Sheet 1

Foraker A. Cabell
INVENTOR.

BY *Clarence A. O'Brien*
*and Harvey B. Jackson*
Attorneys

Foraker A. Cabell
INVENTOR.

April 23, 1957 F. A. CABELL 2,789,447
AUTOMATIC HYDRAULIC DIFFERENTIAL CONTROL MECHANISM
Filed April 26, 1955 4 Sheets-Sheet 3
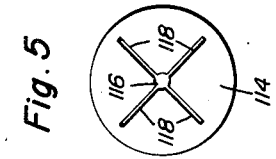
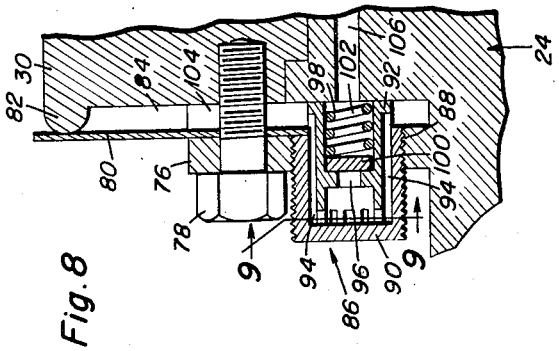
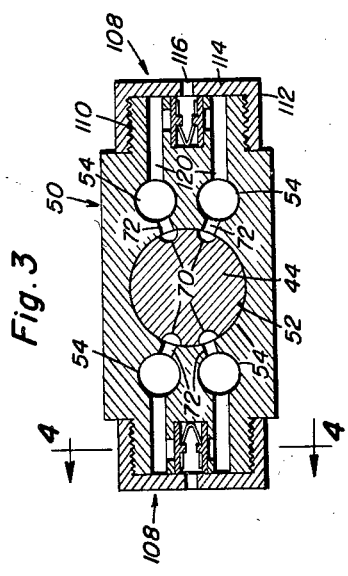
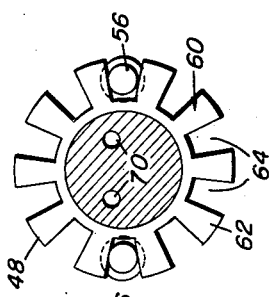
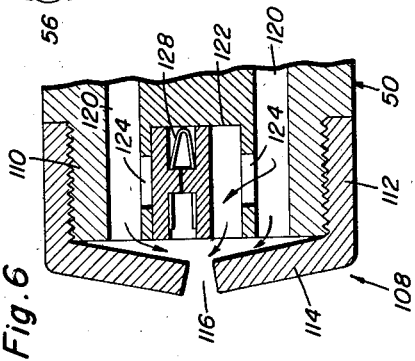
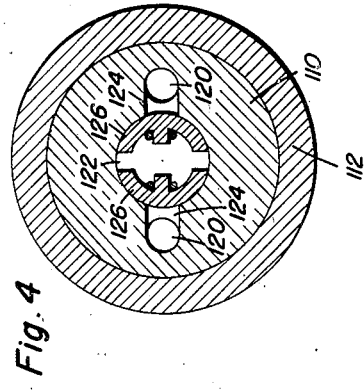
Foraker A. Cabell
INVENTOR.
BY *Clarence A. O'Brien*
*and Harvey B. Jacobson*
Attorneys

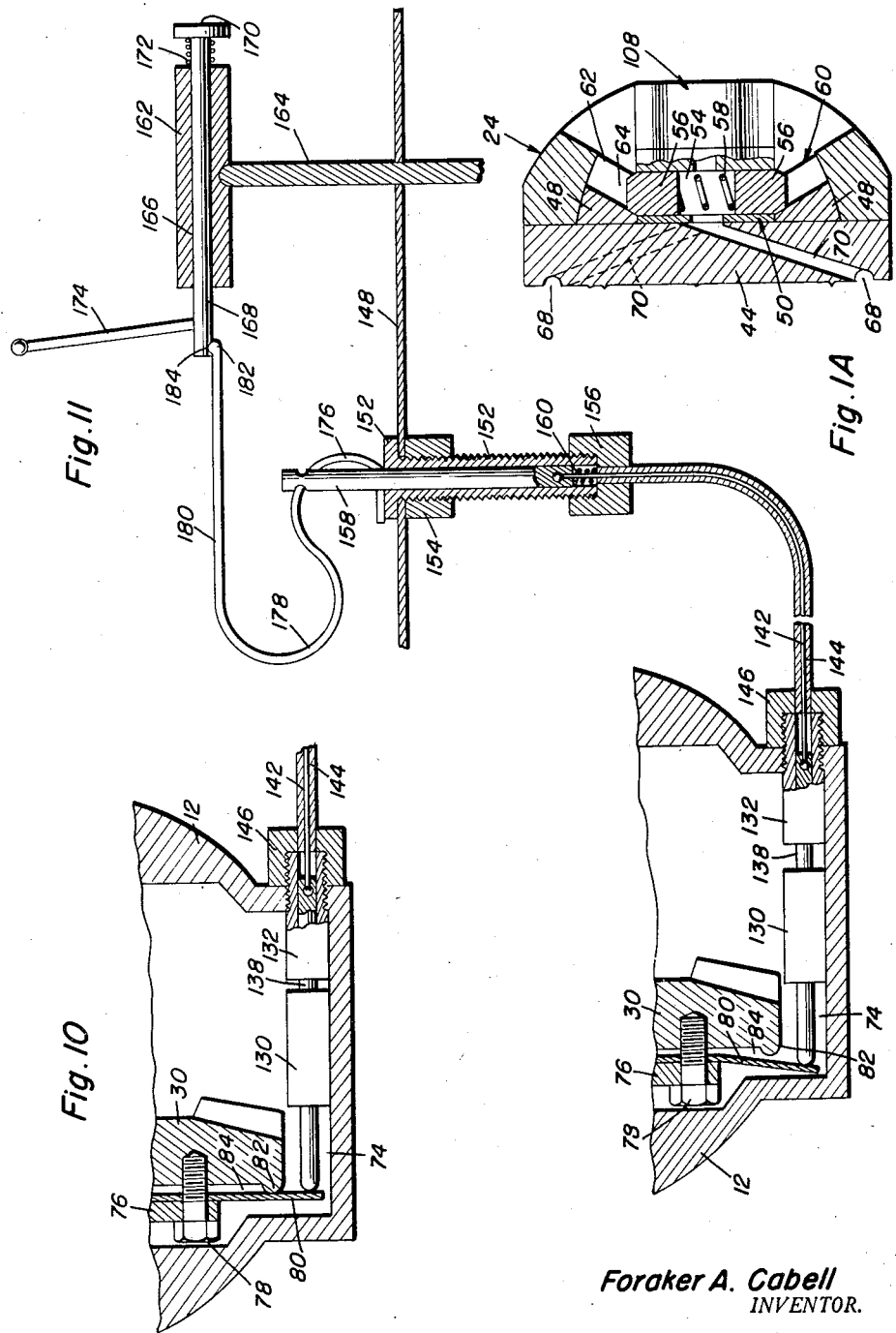

United States Patent Office 2,789,447
Patented Apr. 23, 1957

2,789,447

AUTOMATIC HYDRAULIC DIFFERENTIAL CONTROL MECHANISM

Foraker A. Cabell, Nashville, Tenn.

Application April 26, 1955, Serial No. 503,977

12 Claims. (Cl. 74—711)

This invention relates to new and useful improvements in drive mechanism for automotive vehicles, and more specifically to an improved automatic hydraulic differential control mechanism.

This invention is an improvement on my copending application, Serial No. 290,552, filed May 28, 1952 and now Patent No. 2,722,134, issued November 1, 1955.

A primary object of this invention is to provide an improved mechanism which may be mounted within the housing of the differential assembly of a vehicle which will retard the relative turning of the rear axles of such vehicle in order to control the differential action of the differential assembly.

Another object of this invention is to provide an improved differential control mechanism which will effectively control the differential action of the rear axles of a vehicle, when desired, and at the same time provides at all times sufficient unregulated differential action to permit the vehicle to safely turn any corner.

Still another object of this invention is to provide an improved pick-up assembly for a differential control mechanism which utilizes a lubricant supply of the differential assembly, the pick-up including an elastic disk valve member which is selectively urged to an open position for picking up lubricant from a lubricant supply.

Still another object of this invention is to provide an improved differential control mechanism which may be mounted within a conventional differential assembly by replacing only several features thereof and modifying several other features.

A further object of this invention is to provide an improved outlet valve for use in conjunction with a pump of the differential control mechanism, the outlet valve being of such a nature so as to permit the restricted flow of lubricant or other fluid from the pump and at the same time, being provided with a relief mechanism to suddenly permit an increase in flow upon an increase in pressure upon the outlet valve.

A still further object of this invention is to provide an improved control for a differential control mechanism, the control being associated with the accelerator pedal of a vehicle and being actuated in response to actuation of the accelerator pedal.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1A is a fragmentary longitudinal sectional view showing the details of the control mechanism when the pistons thereof are expanded prior to a pumping action, such as that illustrated in Figure 1;

Figure 3 is a horizontal sectional view taken through the spacer block which is disposed between the rear axle pinions and which carries the differential control mechanism;

Figure 4 is an enlarged vertical sectional view taken substantially on the plane indicated by the section line 4—4 of Figure 3 and shows the specific details of the relief valve mechanism of the differential control mechanism;

Figure 5 is an end elevational view of one of the caps of the relief valve and shows the formation of the restricted outlet openings formed therein;

Figure 6 is an enlarged fragmentary sectional view similar to Figure 3 and shows the operation of one of the relief valves with the relief mechanism thereof in operation;

Figure 7 is a sectional view taken through a differential pinion shaft immediately below one of the differential pinions and shows the details of the cam surface on the innerside of an associated one of the differential pinions;

Figure 8 is an enlarged fragmentary sectional view similar to Figure 2 and shows the specific details of an inlet valve for the differential control mechanism;

Figure 9 is an enlarged fragmentary sectional view taken substantially upon the plane indicated by the section line 9—9 of Figure 8 and shows further the details of the inlet valve;

Figure 10 is a fragmentary sectional view on a smaller scale similar to Figure 2 and shows the follower for the elastic disk valve in an inoperative position; and Figure 11 is a sectional view on a small scale showing the means for operating the follower to control positioning of the elastic disk valve member.

Figure 1:
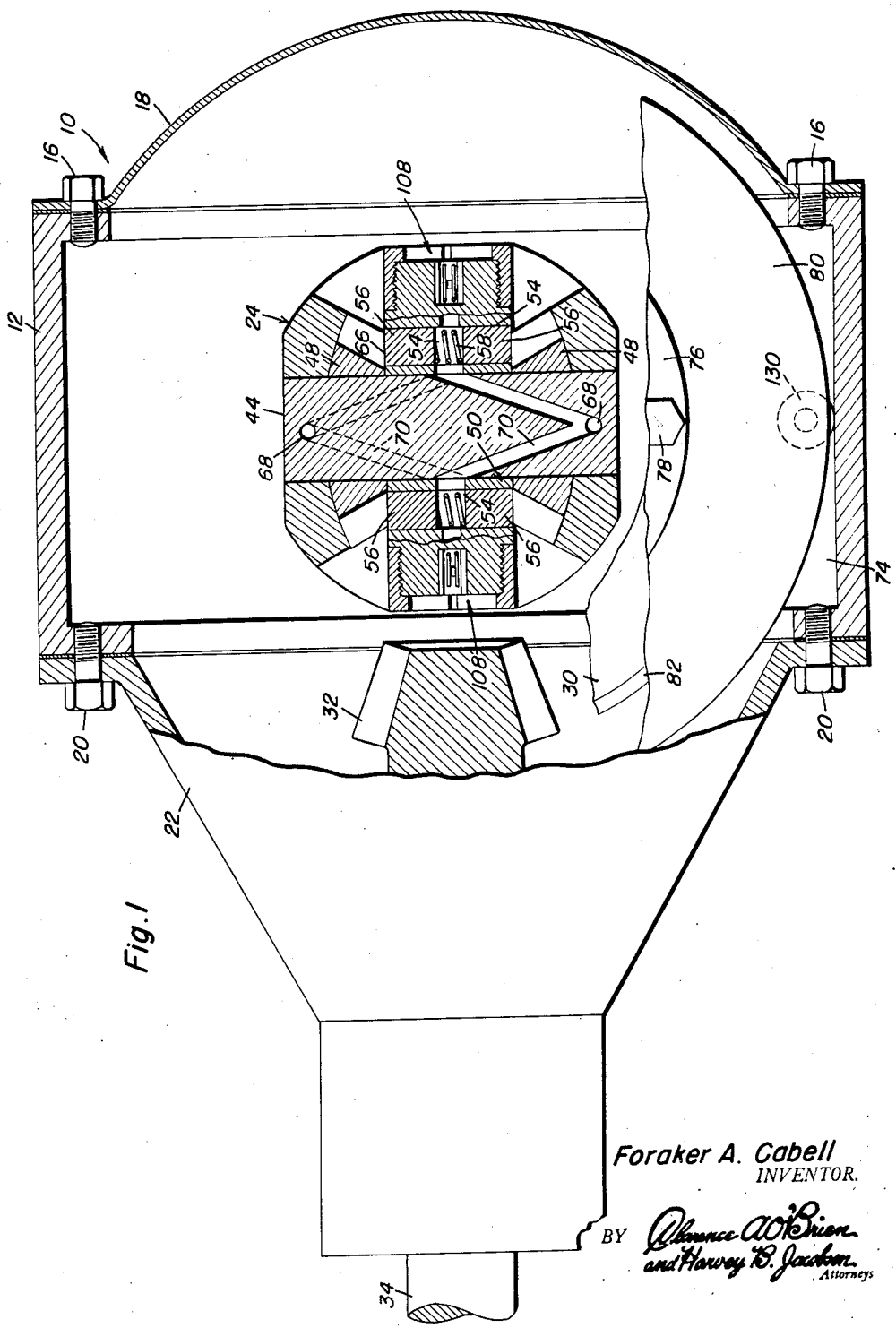
Figure 1 is a longitudinal vertical sectional view taken through a conventional type of differential provided with the differential control mechanism which is the subject of this invention, there being illustrated the specific details of a pump and relief mechanism which permits the controlling of the differential action of the rear end of the vehicle.
Figure 2:
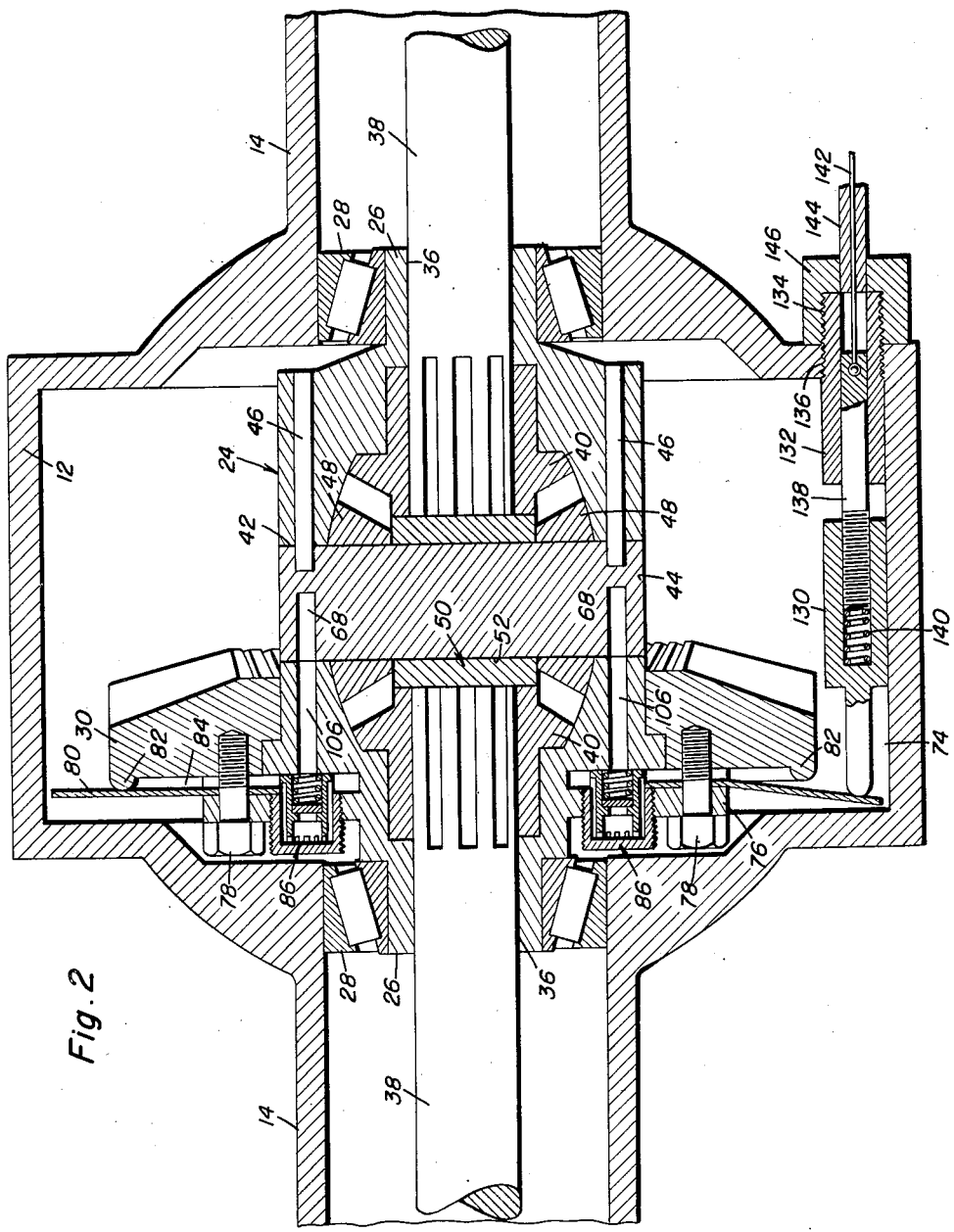
Figure 2 is a transverse vertical sectional view showing the specific details of the pick-up of the intake for the pump mechanism of the differential control mechanism, the pick-up being illustrated in a pick-up position with the elastic disk valve thereof being urged to an open position when in alignment with the sump portion of the rear end housing.

Referring now to the drawings in detail, it will be seen that there is illustrated in Figure 1 a central portion of a vehicle rear end which is referred to in general by the reference numeral 10. The rear end 10 includes a centrally located rear axle gear case portion 12 which has formed integrally therewith outwardly projecting rear axle housings 14, as is best illustrated in Figure 2. Removably secured to the rear of the rear axle gear case portion 12 by a suitable fastener 16 is a rear cover 18. Connected to the forward side of the rear axle gear case portion 12 by means of a plurality of fasteners 20 is a forward drive pinion housing 22.

Positioned within the rear axle gear case portion 12 is a transversely extending differential carrier which is referred to in general by the reference numeral 24. The differential carrier 24 includes reduced end portions 26 which are received within suitable bearings 28 carried by inner portions of the rear axle housings 14 to rotatably support the carrier 24.

Secured to the carrier 24 adjacent one end thereof is a longitudinally disposed ring gear 30. The ring gear 30 is meshed with a drive pinion gear 32 carried by a drive pinion shaft 34 which is suitably journaled in the drive pinion housing 22.

The differential carrier 24 is hollow and includes transversely extending bores 36 on opposite ends thereof. Extending through the bores 36 are rear axles 38. Disposed within the differential carrier 24 in alignment with the rear axles 38 are rear axle pinions 40, the rear axle pinions 40 being suitably journaled within the carrier 24 for rotation. The rear axle pinions 40 are internally splined and receive the splined inner ends of the rear axles 38.

Extending through the differential carrier 24 normal to the axis of the rear axles 38 is a bore 42. Releasably secured in the bore 42 is a shaft 44, the shaft 44 being retained in position by pins 46. Mounted on the shaft 44 adjacent the ends thereof, but within the confines of the differential carrier 24, are differential pinions 48. The differential pinions 48 are meshed with the rear axle pinions 40 and permit the differential action between the individual rear axle housings 38.

In order that the rear axle pinions 40 may be retained in place, there is provided a spacer block which is referred to in general by the reference numeral 50. The spacer block 50 is provided with a central bore 52 through which the shaft 44 passes, the shaft 44 positioning the spacer block 50 within the differential carrier 24.

Referring now to Figure 3 in particular, it will be seen that the spacer block 50 is generally rectangular in cross-section normal to the axis of the shaft 44 and is elongated along an axis normal to the axis of the rear axles 38. Formed on opposite sides of the bore 52 are pairs of cylinders 54 which are formed in the spacer blocks 50 and which extend between the differential pinions 48. Disposed in each of the cylinders 54 is a pair of opposed pistons 56. The pistons 56 are spaced apart by a centrally located spring 58 which urges the pistons 56 outwardly towards the differential pinions 48. Inasmuch as each cylinder 54 and its associated pistons 56 operate in the same manner and are identical, only one cylinder and one set of pistons 56 will be described in detail.

Referring now to Figure 7 in particular, it will be seen that each of the differential pinions 48 has the inner surface thereof in the form of a cam 60. The cam 60 consists of a plurality of fingers 62 which are separated by openings 64. The openings 64 are of a size to receive an outer end of one of the pistons 56, the outer end of each piston 56 being provided with a cam surface 66, as is best illustrated in Figure 1. In an at rest position of the differential assembly, the pistons 56 are urged outwardly by their respective springs 58, and the outer ends thereof are disposed within the recesses 64, as is best illustrated in Figure 1A. However, when a differential action results, the rear axles 38 rotate relative to each other with the result that the differential pinions 48 are driven. The rotation of the differential pinions 48 will result in the reciprocation of the pistons 56 within their respective cylinders 54 to function as pumps.

In order that a fluid may be delivered to the cylinders 54 to permit a pumping action by the pistons 56, there is formed in the shaft 44 adjacent the opposite ends thereof inlet passages 68. The inlet passages 68 are disposed normal to the axis of the shaft 44 and communicate with V-shaped inlet passages 70 which converge towards the center of the shaft 44 and which communicate with inlet passages 72 formed in the spacer block 50, the inlet passages 72 being communicated with the cylinders 54, as is best illustrated in Figure 3.

Inasmuch as the rear axle gear case portion 12 has formed in the the lower portion thereof a sump 74 carrying a lubricant supply for the differential assembly, it is the intention of this invention to utilize this lubricant supply as a fluid for the pump assemblies described above. In order to accomplish this, it is necessary that a suitable pick-up be provided.

The differential carrier 24 is provided adjacent one end thereof with a mounting flange 76. The mounting flange 76 carries a plurality of fasteners 78 which releasably secure the ring gear 30 to the annular flange 76. Carried by the fasteners 76 and disposed between the flange 76 and the ring gear 30 is an elastic disk valve member 80. As is best illustrated in Figure 2 at the upper part thereof, the ring gear 30 is provided on the face thereof opposed to the disk valve member 80 with a projecting annular flange 82 which engages the disk valve member 80. The disk valve member 80 in conjunction with the ring gear 30 forms an annular pick-up passage 84. While the pick-up passage 84 is normally closed by the disk valve member 80, when the disk valve member 80 is urged away from the flange 82 in the vicinity of the sump 74, in a manner to be described hereinafter, it will be readily apparent that lubricant disposed in the sump 74 will be picked up by the pick-up passage 84.

Referring now to Figures 2 and 8 in particular, it will be seen that there is carried by the annular flange 76 in alignment with each of the inlet passages 68 an inlet valve assembly which is referred to in general by the reference numeral 86. Inasmuch as the inlet valve assemblies 86 are identical, only one of them will be described.

Formed in the annular flange 76 for each inlet valve assembly 82 is an internally threaded bore 88. Threadedly engaged in the bore 88 is a valve housing 90 having an open inner end. Disposed in the valve housing 90 is a valve body 92 which abuts against the carrier 24 and which is held in place by the housing 90. The valve body 92 is provided with a plurality of inlet passages 94 which communicate with a single inlet passage 96.

The inner end of the valve body 92 is provided with an enlarged bore 98 aligned with the inlet passage 96. Disposed within the bore 98 is a check valve member 100 normally urged to a closed position by a spring 102. The valve member 100 normally closes the inlet passage 96. The inlet passages 94 are communicated with the annular pick-up passage 84 by suitable inlet passages 104.

Formed in the differential carrier 24 is a pair of inlet passages 106. The inlet passages 106 are aligned with and form extensions of the inlet passages 68. The outer ends of the inlet passages 106 terminate in alignment with the bore 98 so that lubricant may be received through the inlet valve assembly 86.

Referring now to Figures 3, 4, 5 and 6 in particular, it will be seen that the opposite ends of the spacer block 50 are in the form of relief valve assemblies 108. Inasmuch as the relief valve assemblies 108 are identical, only one of them will be set forth in detail.

Each of the relief valve assemblies 108 includes an externally threaded extension 110 on the spacer block 50. Removably threaded on the extension 110 is a cap 112. The cap 112 includes an end wall 114 having a central bore 116 and radiating slits 118. The central bore 116 normally functions as a relief opening in a manner to be described in more detail hereinafter.

Formed in the spacer block 50 and the extensions 110 are outlet passages 120 which communicate with the central portions of the cylinders 54. The outer ends of the outlet passages 120 open through the ends of the extension 110 and are normally closed by the end wall 114.

Referring now to Figure 6 in particular, it will be seen that the extension 110 is provided with a centrally located outer bore 122 which opens through the outer end of extension 110. The bore 122 is communicated with the outlet passages 120 by outlet passages 124 which are disposed normal to the axis of the outlet passages 120 in the bore 122.

Positioned within the bore 122, as is best illustrated in Figure 4, are segmental valve members 126. The valve members 126 normally close the outlet passages 124 and are urged apart by suitable springs 128.

In the normal operation of the relief valve assembly 108, fluid, preferably lubricant from the rear axle gear case portion 12, is pumped into the outlet passages 120 from the cylinders 54. Such fluid then passes into the outlet passages 124 forcing the valve members 126 out of their closed positions and permitting the flow of fluid out through the bore 116. However, the bore 116 is of a size to permit only limited flow of fluid and will not accommodate the full capacity of the cylinders 54 and their respective pistons 56 which form the pump assemblies described above.

As has been previously described, the pistons 56 are reciprocated to effect pumping upon rotation of the differential pinions 48 due to differential action between the rear axles 38. Thus, the permitting of limited pumping by the pistons 56 permits limited unregulated differential action between the rear axles 38. On the other hand, because of the control of the flow from the cylinders 54, it will be readily apparent that the differential action between the rear axles 38 is restrained.

This differential action is sufficient to cause a locking of the rear axles 38 with respect to each other in normal straight driving, and at the same time, will permit sufficient differential action for the vehicle to take any turn permitted by the vehicle at the particular speed it is traveling. However, since the differential action is restrained, there will be a full drive to the two rear axles 38 at all times.

In the event of a blow-out or similar occurrences, the rear axles 38 will tend to have unrestricted differential action therebetween. Full differential action is not desired, although a greater amount of differential action between the rear axles 38 than that permitted by the bore 116 is required. In order to permit this, the end wall 114 is formed of a resilient material and because of the slits 118, the end wall 114 may be deformed upon the existence of sufficient pressure within the outlet passages 122. The deformed condition of the end wall 114 is best illustrated in Figure 6. At this time, flow through the valve assemblies 108 is greatly increased, thereby permitting the desired differential action between the axles 38.

It is to be understood at this time that the valve assemblies 108 discharge through the differential carrier 24. Thus, the lubricant which is pumped by the pistons 56 will be returned to the sump 74.

From the foregoing description of the differential control mechanism, it will be readily apparent that unless lubricant stored in the sump 74 is picked up by the pick-up passage 84, the differential control mechanism will not operate inasmuch as there will be no lubricant available for the pistons 56 to pump. In order to control the pick-up of lubricant from the sump 74, there is provided a follower 130 which is mounted within the sump 74 and which is engageable with the elastic disk valve member 80 to distort it as it rotates through the sump 74 with the ring gear 30 to move it into spaced relation with respect to the annular flange 82 of the ring gear 30. Thus, when the follower 130 engages the disk valve member 80, that portion of the pick-up passage 84 which is in communication with the lubricant supply in the sump 74 will be open and the desired lubricant will be picked up. On the other hand, when the follower 130 is out of engagement with the disk valve member 80, the pick-up passage 84 will remain closed and no lubricant will be picked up.

In order to accomplish positioning of the follower 130, there is provided a sleeve 132. The sleeve 132 includes an externally threaded end portion 134 which is threadedly engaged in a bore 136 through the rear axle gear case portion 12, as is best illustrated in Figure 2. The sleeve 132 has slidably disposed therein a rod 138 on which is threadedly engaged the follower 130. In order that adjustment between the follower 130 and the rod 138 may be maintained, there is disposed within the follower 130 a spring 140 which bears against the ends of the rod 138.

Secured to the opposite end of the rod 138 is a control cable 142. The control cable 142 is disposed within the flexible housing 144 carried by a cap 146 removably engaged on the threaded end portion 134 of the sleeve 132 disposed exteriorly of the rear axle gear case portion 12.

Referring now to Figure 11 in particular, it will be seen that there is illustrated a floor board 148 of a vehicle. Passing downwardly through the floor board 148 is a tubular housing 150 having a head portion 152 resting on the upper surface of the floor board 148. The tubular housing 150 is secured to the floor board 148 by a nut member 154 threadedly engaged thereon and engaging the underside of the floor board 148 to clamp the floor board 148 between the nut member 154 and the head 152. A fitting 156 is utilized to secure the forward end of the flexible housing 144 to the tubular housing 150.

Extending down through the tubular housing 150 is a push-pull rod 158 which has the lower end thereof connected to the forward end of the control cable 142. Disposed between the lower end of the push-pull rod 158 and the fitting 156 is a spring 160 to normally urge the push-pull rod 158 to an up position.

Suitably hingedly connected to the floor board 148 in overlying relation thereto is an accelerator pedal 162. The accelerator pedal 162 has connected to the underside thereof an accelerator rod 164. It is to be understood that when the accelerator pedal 162 is depressed, the accelerator rod 164 will also be depressed to open the throttle of an internal combustion engine (not shown) to which the accelerator rod 164 is connected.

Extending transversely through the accelerator pedal 162 is a bore 166 in which there is mounted an arm 168 for sliding movement transversely of the accelerator pedal 162. The arm 168 is provided at one end thereof with a head 170. Engaged over the arm 168 between the head 170 and a side of the accelerator pedal 162 is a spring 172 which normally urges the arm 168 to the right. Extending upwardly from the opposite end portion of the arm 168 is a guide 174 engageable by an operator's foot in the normal engagement of the accelerator pedal 162 to move the arm 168 to the left against the urging of the spring 172.

Connected to the upper part of the push-pull rod 158 is a spring 176. The spring 176 has a loop portion 178 immediately adjacent the push-pull rod 158 and an upper flat portion 180. The end of the spring 176 remote from the push-pull rod 158 terminates in a ball 182 selectively receivable in a socket 184 formed in the underside of the arm 168.

When the operator's foot is off the accelerator pedal 162, the arm 168 is in a position to the right of the position illustrated in Figure 11 and disconnected from the spring 176. However, when the operator's foot is engaged with the accelerator pedal 162, the side pressure of the foot on the guide 174 will move the arm 168 into overlying relation with respect to the ball 182 so that it will seat in the socket 184. As the accelerator pedal 162 is depressed, the spring 176 will move downwardly therewith to move the push-pull rod 158 downwardly, thereby moving the follower 130 to the left and opening the disk valve 80. This will permit the supplying of oil to the pump assembly so that the control mechanism will operate in the manner described above. It is to be understood that the tension of the spring 176 is such that the push-pull rod 158 will be depressed before the spring 176 is flexed. After the push-pull rod 158 has moved its complete length of travel, the spring 176 will then flex with further downward movement of the arm 168 by the accelerator pedal 162.

It will be readily apparent from the foregoing description of the control that as soon as the operator's foot is removed from the accelerator pedal 162, the follower 130 will move to the right allowing the disk valve member 80 to return to its normal closed position, thereby disconnecting the control mechanism.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A differential control mechanism comprising a differential assembly including spaced axle gears and differential gears, a spacer block disposed between said axle gears, a shaft carried by said spacer block, said differential gears being mounted on said shaft in meshing engagement with said axle gears, at least one cylinder formed in said spacer block, a lubricant supply for said axle gears and said differential gears, means connecting said cylinder with said lubricant supply, an outlet connected to said cylinder, valve means controlling flow of lubricant through said outlet, at least one piston mounted in said cylinder, said piston being engaged by one of said differential gears for reciprocation by said one differential gear in response to rotation of said one differential gear due to relative rotation of said axle gears.

2. A differential control mechanism comprising a differential assembly including spaced axle gears and differential gears, a spacer block disposed between said axle gears, a shaft carried by said spacer block, said differential gears being mounted on said shaft in meshing engagement with said axle gears, at least one cylinder formed in said spacer block, a lubricant supply for said axle gears and said differential gears, means connecting said cylinder with said lubricant supply, an outlet connected to said cylinder, valve means controlling flow of lubricant through said outlet, at least one piston mounted in said cylinder, said piston being engaged by one of said differential gears for reciprocation by said one differential gear in response to rotation of said one differential gear due to relative rotation of said axle gears, said first mentioned means including a valve mechanism for controlling pick-up of lubricant from said lubricant supply, means for remotely operating said valve mechanism.

3. A differential control mechanism comprising a differential assembly including spaced axle gears and differential gears, a spacer block disposed between said axle gears, a shaft carried by said spacer block, said differential gears being mounted on said shaft in meshing engagement with said axle gears, at least one cylinder formed in said spacer block, a lubricant supply for said axle gears and said differential gears, means connecting said cylinder with said lubricant supply, an outlet connected to said cylinder, valve means controlling flow of lubricant through said outlet, at least one piston mounted in said cylinder, said piston being engaged by one of said differential gears for reciprocation by said one differential gear in response to rotation of said one differential gear due to relative rotation of said axle gears, said first mentioned means including a rotating member rotating in said lubricant supply, said rotating member having an annular pick-up passage, an elastic disk valve member carried by said rotating member and normally forming a wall of said pick-up passage, means for selectively moving said valve member to an open position.

4. A differential control mechanism comprising a differential assembly including spaced axle gears and differential gears, a spacer block disposed between said axle gears, a shaft carried by said spacer block, said differential gears being mounted on said shaft in meshing engagement with said axle gears, at least one cylinder formed in said spacer block, a lubricant supply for said axle gears and said differential gears, means connecting said cylinder with said lubricant supply, an outlet connected to said cylinder, valve means controlling flow of lubricant through said outlet, at least one piston mounted in said cylinder, said piston being engaged by one of said differential gears for reciprocation by said one differential gear in response to rotation of said one differential gear due to relative rotation of said axle gears, said first mentioned means including a rotating member rotating in said lubricant supply, said rotating member having an annular pick-up passage, an elastic disk valve member carried by said rotating member and normally forming a wall of said pick-up passage, means for selectively moving said valve member to an open position, said last mentioned means including a follower engageable with said valve member to move a portion of said valve member to an open position when said portion is disposed in said lubricant supply.

5. A differential control mechanism comprising a differential assembly including spaced axle gears and differential gears, a spacer block disposed between said axle gears, a shaft carried by said spacer block, said differential gears being mounted on said shaft in meshing engagement with said axle gears, at least one cylinder formed in said spacer block, a lubricant supply for said axle gears and said differential gears, means connecting said cylinder with said lubricant supply, an outlet connected to said cylinder, valve means controlling flow of lubricant through said outlet, at least one piston mounted in said cylinder, said piston being engaged by one of said differential gears for reciprocation by said one differential gear in response to rotation of said one differential gear due to relative rotation of said axle gears, said first mentioned means including a ring gear of said differential assembly, said ring gear having an annular pick-up passage, an elastic disk valve member connected to said ring gear and normally forming a wall of said pick-up passage, means for selectively moving said valve member to an open position.

6. A differential control mechanism comprising a differential assembly including spaced axle gears and differential gears, a spacer block disposed between said axle gears, a shaft carried by said spacer block, said differential gears being mounted on said shaft in meshing engagement with said axle gears, at least one cylinder formed in said spacer block, a lubricant supply for said axle gears and said differential gears, means connecting said cylinder with said lubricant supply, an outlet connected to said cylinder, valve means controlling flow of lubricant through said outlet, at least one piston mounted in said cylinder, said piston being engaged by one of said differential gears for reciprocation by said one differential gear in response to rotation of said one differential gear due to relative rotation of said axle gears, said one differential gear including a cam surface, said piston being resiliently retained in engagement with said cam surface.

7. A differential control mechanism comprising a differential assembly including spaced axle gears and differential gears, a spacer block disposed between said axle gears, a shaft carried by said spacer block, said differential gears being mounted on said shaft in meshing engagement with said axle gears, at least one cylinder formed in said spacer block, a lubricant supply for said axle gears and said differential gears, means connecting said cylinder with said lubricant supply, an outlet connected to said cylinder, valve means controlling flow of lubricant through said outlet, at least one piston mounted in said cylinder, said piston being engaged by one of said differential gears for reciprocation by said one differential gear in response to rotation of said one differential gear due to relative rotation of said axle gears, said valve means including a flow restricting valve permitting limited flow from said cylinder thereby permitting resisted limited relative rotation of said axle gears, said flow restricting valve including a relief mechanism to permit increased flow from said cylinder upon an increase in pressure in said outlet.

8. A differential control mechanism comprising a differential assembly including spaced axle gears and differential gears, a spacer block disposed between said axle gears, a shaft carried by said spacer block, said differential gears being mounted on said shaft in meshing engagement with said axle gears, at least one cylinder formed in said spacer block, a lubricant supply for said axle gears and said differential gears, means connecting said cylinder with said lubricant supply, an outlet connected to said cylinder, valve means controlling flow of lubricant through said outlet, at least one piston mounted in said cylinder, said piston being engaged by one of said differential gears for reciprocation by said one differential gear in response to rotation of said one differential gear due to relative rotation of said axle gears, said valve means including a flow restricting valve permitting limited flow from said cylinder thereby permitting resisted limited relative rotation of said axle gears, said flow restricting valve including a relief mechanism to permit increased flow from said cylinder upon an increase in pressure in said outlet, said relief mechanism including a cap on said flow restricting valve, said cap having a restricted passage therethrough, said cap being deformable to increase the size of said passage.

9. A differential control mechanism comprising a differential assembly including spaced axle gears and differential gears, a spacer block disposed between said axle gears, a shaft carried by said spacer block, said differential gears being mounted on said shaft in meshing engagement with said axle gears, at least one cylinder formed in said spacer block, a lubricant supply for said axle gears and said differential gears, means connecting said cylinder with said lubricant supply, an outlet connected to said cylinder, valve means controlling flow of lubricant through said outlet, at least one piston mounted in said cylinder, said piston being engaged by one of said differential gears for reciprocation by said one differential gear in response to rotation of said one differential gear due to relative rotation of said axle gears, said first mentioned means including a rotating member rotating in said lubricant supply, said rotating member having an annular pick-up passage, an elastic disk valve member carried by said rotating member normally forming a wall of said pick-up passage, means for selectively moving said valve member to an open position, said last mentioned means including a follower engageable with said valve member to move a portion of said valve member to an open position when said portion is disposed in said lubricant supply, means for connecting said follower to an accelerator pedal for actuation in response to actuation of the accelerator pedal.

10. In a differential control mechanism the combination of a fluid pump having an inlet connected to a lubricant supply, a lubricant pick-up for said inlet including a rotating member of the differential rotating in the lubricant supply, said rotating member having an annular pick-up passage, an elastic disk valve member connected to said rotating member and normally forming a wall of said annular pick-up passage, a fixed follower selectively engageable with said valve member to continuously open a portion of said valve member when said portion is disposed in the lubricant supply.

11. In a differential control mechanism the combination of a fluid pump having an inlet connected to a lubricant supply, a lubricant pick-up for said inlet including a rotating member of the differential rotating in the lubricant supply, said rotating member having an annular pick-up passage, an elastic disk valve member connected to said rotating member and normally forming a wall of said annular pick-up passage, a fixed follower selectively engageable with said valve member to continuously open a portion of said valve member when said portion is disposed in the lubricant supply, said rotating member being in the form of the ring gear of the differential.

12. In a differential control mechanism the combination of a fluid pump having an inlet connected to a lubricant supply, a lubricant pick-up for said inlet including a rotating member of the differential rotating in the lubricant supply, said rotating member having an annular pick-up passage, an elastic disk valve member connected to said rotating member and normally forming a wall of said annular pick-up passage, a fixed follower selectively engageable with said valve member to continuously open a portion of said valve member when said portion is disposed in the lubricant supply, means for connecting said follower to an accelerator pedal for actuation in response to actuation of the accelerator pedal.

References Cited in the file of this patent
UNITED STATES PATENTS

| | | |
|---|---|---|
| 2,221,189 | Hodge | Nov. 12, 1940 |
| 2,593,315 | Kraft | Apr. 15, 1953 |